United States Patent Office 3,203,965
Patented Aug. 31, 1965

3,203,965
6α-METHYL-Δ$^{1,4}$-PREGNADIEN-17α-OL-3,20-DIONE AND ESTERS THEREOF
Howard J. Ringold and George Rosenkranz, Mexico City, Mexico, assignors, by mesne assignments, to Syntex Corporation, a corporation of Panama
No Drawing. Filed June 25, 1958, Ser. No. 744,347
Claims priority, application Mexico, May 14, 1958, 50,998
4 Claims. (Cl. 260—397.4)

This application is a continuation-in-part of our copending application Serial No. 709,795, filed January 20, 1958, now abandoned.

The present invention relates to novel cyclopentanophenanthrene compounds.

More particularly the present invention relates to the novel 6α-methyl-Δ$^{1,4}$-pregnadien-17α-ol-3,20-dione and its hydrocarbon carboxylic acid esters of less than 12 carbon atoms. The compounds of the present invention and especially the esters of 6α-methyl-Δ$^{1,4}$-pregnadien-17α-ol-3,20-dione are very valuable progestational hormones having the same type of valuable action as progesterone but to a surprisingly greater amount.

In our U.S. patent application Serial No. 679,762, filed August 22, 1957, there is disclosed the production of 6α-methyl-Δ$^4$-pregnen-17α-ol-3,20-dione and the hydrocarbon carboxylic acid esters thereof.

In accordance with the present invention it has been discovered that dehydrogenation of 6α-methyl-Δ$^4$-pregnen-17α-ol-3,20-dione or the hydrocarbon carboxylic acid esters thereof with selenium dioxide for example produces the potent progestational hormones of the present invention previously referred to. The novel progestational hormones of the present invention may be illustrated by the following formula:

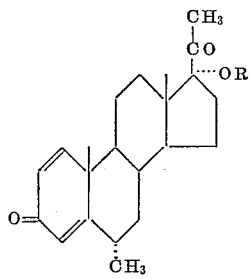

In the above formula R represents hydrogen or a hydrocarbon carboxylic acid ester group of less than 12 carbon atoms. These ester groups as well known in the steroid art may be saturated or unsaturated, straight or branched chain aliphatic, cyclic or mixed cyclic-aliphatic and may be conventionally substituted as by halogen or methoxy. Typical ester groups are acetate, propionate, cyclopentylproprionate, caproate, enanthate, benzoate, trimethylacetate, etc.

The process for the production of the above novel compounds may be illustrated by the following equation:

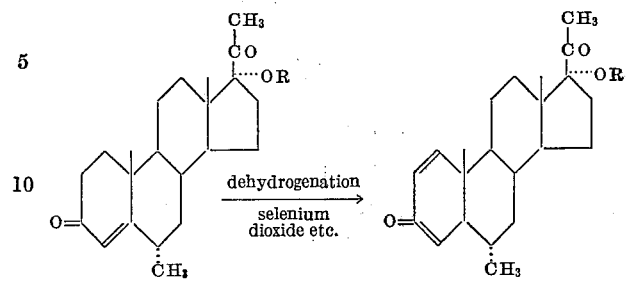

In the above equation R represents the same groups as heretofore set forth.

In practicing the process above outlined 6α-methyl-Δ$^4$-pregnen-17α-ol-3,20-dione or an ester of the character hereinbefore set forth is refluxed with selenium dioxide in the presence of t-butanol and preferably a catalytic amount of pyridine. The reaction product after conventional purification is the corresponding 6α-methyl-Δ$^{1,4}$-pregnadien-17α-ol-3,20-dione or ester. In place of selenium dioxide other dehydrogenating agents may be used to produce the C-1,2 double bond as for example chloranil in the presence of xylene or n-amyl alcohol or a microbiological treatment such as disclosed in U.S. Patent No. 2,837,464, granted June 3, 1958.

When the end product is an ester of 6α-methyl-Δ$^{1,4}$-pregnadien-17α-ol-3,20-dione, this ester may be conventionally saponified with alkali to give the free compound and conversely the free compound may be conventionally esterified using well known methods for the esterification of tertiary steroid alcohols.

The following specific examples serve to illustrate but are not intended to limit the present invention:

Example I 1 g. of the acetate of 6α-methyl-17-hydroxyprogesterone (acetate of 6α-methyl-Δ$^4$-pregnen-17α-ol-3,20-dione) was refluxed for 72 hours in 50 cc. of t-butanol, together with 0.4 g. of selenium dioxide and 0.4 cc. of pyridine under a nitrogen atmosphere. The reaction product was filtered and the residue was washed with 20 cc. of hot t-butanol. The washings and the filtrate were combined and the solvent evaporated under reduced pressure. The residue was dissolved in acetone, activated carbon was added and the acetone solution refluxed for an hour. The product was then filtered to remove carbon and the acetone evaporated. After conventional chromatography, using an alumina filled column and benzene, benzene-ether as solvents, the product obtained was the acetate of 6α-methyl-Δ$^{1,4}$-pregnadien-17α-ol-3,20-dione.

Example II

When the method of Example I was repeated using as a starting material the free 6α-methyl-17-hydroxyprogesterone, the product obtained was the free 6α-methyl-Δ$^{1,4}$-pregnadien-17α-ol-3,20-dione. Acylation of this compound using conventional acylation procedures for the 17α-hydroxy group, i.e., acid anhydrides or acyl chlorides, esterification medium comprising the corresponding acid and/or an inert solvent such as dioxane; acid catalyst (p-toluenesulfonic acid) gave the corresponding 17-mono esters of hydrocarbon carboxylic acids of less than 12 carbon atoms. Thus prepared were the propionate, cyclopentylpropionate, benzoate, butyrate, caproate and enanthate.

Example III

The procedure of Example I was repeated using as starting material, the propionate, cyclopentylpropionate, benzoate, butyrate and enanthate of 6α-methyl-17-hydroxyprogesterone. The corresponding esters of 6α-methyl-Δ$^{1,4}$-pregnadien-17α-ol-3,20-dione were prepared identical to those of Example II.

We claim:

1. A compound having the following formula:

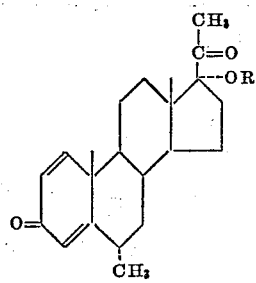

wherein R is selected from the group consisting of hydrogen and a hydrocarbon carboxylic acyl group of less than 12 carbon atoms.

2. 6α-methyl-Δ$^{1,4}$-pregnadien-17α-ol-3,20-dione.

3. The hydrocarbon carboxylic acid esters of 6α-methyl-Δ$^{1,4}$-pregnadien-17α-ol-3,20-dione.

4. The acetate of 6α-methyl-Δ$^{1,4}$-pregnadien-17α-ol-3,20-dione.

References Cited by the Examiner

UNITED STATES PATENTS 2,579,479  12/51  Djerassi _____ 260—397.4

OTHER REFERENCES

JACS, vol. 78, Feb. 20, 1956, pages 816–819.

LEWIS GOTTS, *Primary Examiner.*

B. E. LANHAM, LESLIE H. GASTON, *Examiners.*